(12) United States Patent
Kottilingam et al.

(10) Patent No.: US 8,220,697 B2
(45) Date of Patent: Jul. 17, 2012

(54) WELDABILITY OF ALLOYS WITH DIRECTIONALLY-SOLIDIFIED GRAIN STRUCTURE

(75) Inventors: Srikanth C. Kottilingam, Orlando, FL (US); Peter J. Ditzel, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1611 days.

(21) Appl. No.: 11/036,991

(22) Filed: Jan. 18, 2005

(65) Prior Publication Data
US 2006/0157165 A1 Jul. 20, 2006

(51) Int. Cl.
- C22F 1/10 (2006.01)
- B23K 26/32 (2006.01)
- B23K 26/42 (2006.01)

(52) U.S. Cl. ............... 228/203; 228/119; 228/262.3; 148/426; 148/524; 219/121.14; 219/121.64

(58) Field of Classification Search ............ 228/119, 228/203, 230, 232, 262.3; 219/121.14, 121.15, 219/121.64, 121.85; 416/241 R, 223 R; 148/516, 148/522, 524, 902, 426
See application file for complete search history.

(56) References Cited

U.S. PATENT DOCUMENTS

| | | | |
|---|---|---|---|
| 3,758,741 A | | 9/1973 | Holko et al. |
| 3,805,372 A | * | 4/1974 | Wagenknecht ............ 219/73.1 |
| 3,850,702 A | * | 11/1974 | Buchanan ..................... 419/19 |
| 3,961,739 A | | 6/1976 | Leftheris |
| 4,088,479 A | * | 5/1978 | Spengler ...................... 420/443 |
| 4,148,671 A | * | 4/1979 | Morris et al. ................ 148/552 |
| 4,499,155 A | * | 2/1985 | Holiday et al. .............. 428/586 |
| 4,584,031 A | * | 4/1986 | Grutzner ...................... 148/534 |
| 4,606,778 A | | 8/1986 | Jahnke |
| 4,624,402 A | | 11/1986 | Pitcairn et al. |
| 4,722,469 A | | 2/1988 | Rydstad et al. |
| 4,921,549 A | | 5/1990 | Austin |
| 5,106,010 A | * | 4/1992 | Stueber et al. ............... 228/232 |
| 5,226,981 A | | 7/1993 | Meredith et al. |
| 5,374,319 A | * | 12/1994 | Stueber et al. ............... 148/404 |
| 5,549,768 A | * | 8/1996 | Mahoney ..................... 148/695 |
| 5,725,698 A | * | 3/1998 | Mahoney ..................... 148/695 |
| 5,846,057 A | * | 12/1998 | Ferrigno et al. ......... 416/241 R |
| 6,171,415 B1 | | 1/2001 | Statnikov |
| 6,398,883 B1 | | 6/2002 | Forrest et al. |
| 6,464,806 B1 | | 10/2002 | Naeem et al. |
| 6,491,208 B2 | * | 12/2002 | James et al. ................. 228/119 |
| 6,568,456 B1 | | 5/2003 | Fernihough |
| 6,702,175 B1 | | 3/2004 | Matsushige et al. |
| 6,872,912 B1 | * | 3/2005 | Wos et al. ................ 219/121.64 |
| 7,575,418 B2 | * | 8/2009 | Gigliotti et al. ......... 416/241 R |
| 2003/0000602 A1 | * | 1/2003 | Smith et al. ................. 148/528 |
| 2004/0056075 A1 | * | 3/2004 | Gheorghe .................... 228/199 |
| 2004/0099714 A1 | * | 5/2004 | Strusinski et al. ........... 228/232 |

FOREIGN PATENT DOCUMENTS

| | | | | |
|---|---|---|---|---|
| DE | 3813157 | A | * | 12/1988 |
| JP | 55076025 | | | 6/1980 |
| JP | 56142840 | | | 11/1981 |
| JP | 59179745 | | | 10/1984 |
| JP | 59229414 | | | 12/1984 |
| JP | 359229414 | A | * | 12/1984 |
| JP | 63230279 | | | 9/1988 |
| JP | 63310946 | | | 12/1988 |
| JP | 401176033 | A | * | 7/1989 |
| JP | 401180959 | A | * | 7/1989 |
| JP | 03193849 | | | 8/1991 |
| JP | 403271352 | A | * | 12/1991 |
| SU | 1208083 | A | * | 1/1986 |

* cited by examiner

*Primary Examiner* — Samuel M Heinrich

(57) ABSTRACT

A method of welding alloys having directionally-solidified grain structure. The methods improve the weldability of these alloys by creating a localized region of fine grain structure, wherein the welding occurs in these localized regions. The localized regions are formed by applying strain energy using a variety of different methods, such as by hammer peening, laser peening or sand blasting. Then, a heat treatment step may be used to create recrystallized grains having the fine grain structure. The region of fine grain structure provides better weldability.

18 Claims, No Drawings

WELDABILITY OF ALLOYS WITH DIRECTIONALLY-SOLIDIFIED GRAIN STRUCTURE

FIELD OF THE INVENTION

This invention is directed generally to welding alloys, and more particularly to welding alloys having a directionally-solidified grain structure.

BACKGROUND

Metallic articles may be made with a directionally solidified grain structure to enhance their mechanical properties at elevated temperatures. In particular, it is possible to produce components of a complex design that may be subjected to high thermal and mechanical stresses, such as guide vanes or rotor blades of gas turbines, using directionally solidified casting.

In directional solidification, molten metal in a mold defining the shape of the article is cooled unidirectionally from one end of the mold. The metal solidifies first at the end from which heat is removed and then along the length of the mold as the temperature falls below the solidus temperature. The resulting structure has a number of grains that are elongated along the length of the mold parallel to the heat flow direction. The grain boundaries are parallel to the heat flow direction as well. The grains typically exhibit an oriented grain structure according to the fastest growing crystallographic direction or a seeded orientation introduced at the end first solidified. The grain orientation is selected to achieve good high temperature properties.

In service, the article made by directional solidification may be positioned such that the major mechanical loading is applied parallel to the heat flow direction during solidification. The orientation of the grain structure parallel to the heat flow direction places the greatest material strength in this direction. Additionally, the orientation of the grain boundaries parallel to the heat flow direction reduces the incidence of grain boundary creep. Directional solidification is used to fabricate cast articles of nickel-base superalloys to be used in the hottest portions of aircraft gas turbine engines.

Nickel-base super-alloys are attractive for turbine-engine applications because of their high-temperature strength and corrosion resistance. Particularly important for high temperature applications is the high-temperature creep resistance. To improve engine efficiency, it may be beneficial to increase the operating temperature range of turbine engines to higher temperatures. This has led to an evolution of nickel-base super-alloys, from polycrystalline alloys to directionally-solidified alloys to single-crystal alloys. By aligning the grain structure with the stress axis in directionally-solidified materials, substantial improvements in high-temperature creep resistance were realized.

When an article is directionally solidified, there may be casting defects, both of types common to all casting processes and also of types unique to directional solidification. These defects may often be manifested as cracks, particularly intergranular cracks, that extend parallel to the direction of the solidification. There may be other types of defects produced during solidification and also during service.

Directionally solidified articles are relatively expensive to produce. It is therefore beneficial to repair defects produced during casting or service, if such repair is feasible. Several methods exist for repairing worn or damaged directionally solidified articles. Repair methods include, for example, conventional fusion welding, plasma spray, and the use of a tape or slurry material containing a mixture of a binder and a metal alloy powder which is compatible with the substrate alloy.

In one approach, the defect may be repaired by a fusion welding process. Welding is also an attractive method for fabricating turbine engine components. However, welding is not used extensively because of the vulnerability of nickel-base super-alloys to hot cracking and strain age cracking. In addition, welding may critically alter the grain structure in these alloys, which may lead to poor performance. Nonetheless, welding is attractive because of its potential for large economic benefits. Furthermore, welding is potentially useful in component repair operations. However, when applied to directionally solidified articles, welding may result in an inadequate repair that has an inhomogeneous microstructure and whose mechanical properties are unacceptably low. The repaired article may also tend to be of less ductility than the defect-free article.

Accordingly, what is needed is a method of welding directionally solidified alloys that alleviates the problems of prior art welding of these alloys. Also what is needed is an method that is effective at repairing directionally solidified articles in a cost-effective and/or efficient manner.

SUMMARY OF THE INVENTION

This present invention provides a method for welding alloys having a directionally-solidified grain structure. The methods improve the weldability of these alloys by creating a localized region of fine grain structure. This region of fine grain structure provides better weldability such that welding of the alloys occurs in these localized regions. The localized regions may be formed by applying strain energy or any other energy capable of breaking the existing grain structure. The strain energy may be accomplished using a variety of different methods, such as by hammer/shot peening or sand/shot blasting. Then, a heat treatment step may be used to create recrystallized grains having the fine grain structure.

These and other embodiments are described in more detail below.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

Fusion welding of alloys having a directionally-solidified (DS) grain structure is generally difficult due to liquation and/or strain age cracking. The cracks usually occur at the DS grain boundaries. Due to the nature of the directionally-solidified grain boundary, the cracks initiate and propagate very easily along the grain boundary during welding and heat treatment operations.

Accordingly, the present invention provides an improved method for welding alloys having a directionally-solidified grain structure that helps alleviate the cracking problems that occur during welding and repair of these alloys and articles containing these alloys. The methods involve the creation of a localized region of fine grain structure. The region of fine grain structure provides better weldability due to the tortuous nature of the grain boundaries. The tortuous nature of the fine grain structure grains helps to prevent crack propagation and/ or limit cracks to smaller sizes. The methods of the present invention may also be used to repair articles containing alloys.

In one aspect of the present invention, the methods break down the directionally-solidified grain structure in the areas where welding is to occur. This breaking of the grain structure into finer grains in the alloy or article is accomplished, in one embodiment, by the application of energy. In one embodiment, strain energy is applied.

"Strain energy" is the amount of energy equal to the work that must be done to produce both normal and shear strains in the grain structure. Accordingly, the amount of strain energy that is to be used in the present invention is an amount equal to or in excess of the potential energy stored in the directionally-solidified grains of the alloy that are to be broken down. The strain energy that is applied is designed to cause plastic deformation of the directionally-solidified grains. As this amount may be different for different alloys and articles, the amount of strain energy used in the present invention may vary.

The strain energy may be applied using any method capable of providing sufficient energy to a directionally-solidified grain to cause plastic deformation of the grain. Examples of methods of applying strain energy that may be used in the present invention include, but are not limited to, hammer peening, laser peening, grit blasting, or a combination thereof.

Once the directionally-solidified grains have been broken down in the localized area, these grains are then recrystallized to create finer grains having tortuous grain boundaries. This may be accomplished, in one embodiment, by the use of a heat treatment step. The heat treatment step is selected to be capable of forming fine grains that are substantially equiaxed in nature. The heat treatment causes new deformation (strain energy free) grains to grow at the expense of the strained grains. Examples of heat treatment steps that may be used in the present invention include, but are not limited to, mill anneal, recrystallize anneal, solution treatment and aging, or a combination thereof.

Once the regions of fine grain structure that are substantially equiaxed are formed, these regions may be used to weld alloys together and/or repair turbine components or other article made from these alloys. In one embodiment, the welding may be accomplished using a fusion welding method. As used herein, "fusion welding" is intended to include arc welding, electron beam welding, flash welding, laser welding, or a combination thereof.

The methods of the present invention may also be used in a method for repairing an article, such as a turbine component, that contains one or more alloys. The methods utilize an application of energy to break down the DS grain structure, and then a heat treatment step to recrystallize the grains to a fine grain structure that may then be welded with a reduce risk of cracks, or with smaller cracks.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method for welding alloys having a directionally-solidified grain structure comprising:
   breaking down a portion of the directionally-solidified grain structure in an area to be welded;
   recrystallizing grains in the portion of the directionally-solidified grain structure in the area to be welded to form a localized region of grains having a fine grain structure, and
   welding the alloys in the localized region of grains having a fine grain structure.

2. The method of claim 1, wherein energy is applied to break down the portion of the directionally-solidified gram structure in the area to be welded.

3. The method of claim 2, wherein strain energy is applied to break down the portion of the directionally-solidified grain structure in the area to be welded.

4. The method of claim 3, wherein the strain energy is applied using a method selected from hammer peening, shot peening, laser peening, grit and sand blasting, or a combination thereof.

5. The method of claim 3, wherein the strain energy is applied in an amount sufficient to cause plastic deformation of the directionally-solidified grains in the area to be welded.

6. The method of claim 1, wherein the grains in the portion of the directionally-solidified grain structure in the area to be welded are recrystallized using a heat treatment step.

7. The method of claim 6, wherein the heat treatment step is selected from mill anneal, recrystallize anneal, solution treatment and aging, or a combination thereof.

8. The method of claim 1, wherein fusion welding is used for welding the alloys in the localized region of grains having a fine grain structure.

9. The method of claim 8, wherein the fusion welding is selected from arc welding, electron beam welding, flash welding, laser welding, or a combination thereof.

10. A method for repairing a turbine component having a directionally-solidified grain structure in at least a portion of the turbine component comprising:
    breaking down a portion of the directionally-solidified grain structure in the turbine component;
    recrystallizing grains in the portion of the directionally-solidified grain structure in the turbine component to form a localized region of grains having a fine grain structure; and
    welding the localized region of grains having a fine grain structure.

11. The method of claim 10, wherein energy is applied to break down the portion of the directionally-solidified grain structure in the turbine component.

12. The method of claim 11, wherein strain energy is applied to break down the portion of the directionally-solidified grain structure in the turbine component.

13. The method of claim 12, wherein the strain energy is applied using a method selected from hammer peening, shot peening, laser peening, grit and sand blasting, or a combination thereof.

14. The method of claim 12, wherein the strain energy is applied in an amount sufficient to cause plastic deformation of the directionally-solidified grains in the portion of the turbine component.

15. The method of claim 10, wherein the grains in the portion of the directionally-solidified grain structure in the turbine component are recrystallized using a heat treatment step.

16. The method of claim 15, wherein the heat treatment step is selected from mill anneal, recrystallize anneal, solution treatment and aging, or a combination thereof.

17. The method of claim 10, wherein fusion welding is used for repairing the turbine component.

18. The method of claim 17, wherein the fusion welding is selected from arc welding, electron beam welding, flash welding, laser welding, or a combination thereof.

* * * * *